United States Patent [19]
Oram et al.

[11] Patent Number: 5,946,852
[45] Date of Patent: Sep. 7, 1999

[54] METHOD AND SYSTEM FOR SIMULATING THE SOLAR CYCLE

[75] Inventors: James W. Oram, Charlotte, N.C.; Alan M Schulman, Highland Park, Ill.

[73] Assignee: Glentronics, Inc., Glenview, Ill.

[21] Appl. No.: 08/837,553

[22] Filed: Apr. 21, 1997

[51] Int. Cl.⁶ .............................. A01G 9/20; I01G 9/26; F21S 1/14; F21V 33/00
[52] U.S. Cl. .................... 47/58.1; 47/17; 47/39; 47/1.01 R; 315/76; 362/85; 362/805
[58] Field of Search ............... 47/58, 58.1, 17, 47/39, 1.01 R; 362/805, 85; 315/76

[56] References Cited

U.S. PATENT DOCUMENTS

| | | | |
|---|---|---|---|
| D. 342,799 | 12/1993 | Ham | D26/26 |
| 4,051,626 | 10/1977 | Trumley et al. | 47/17 |
| 4,068,405 | 1/1978 | Campbell et al. | 47/65 |
| 4,074,124 | 2/1978 | Maute et al. | 362/217 |
| 4,247,766 | 1/1981 | Warren et al. | 250/214 |
| 4,430,828 | 2/1984 | Oglevee et al. | 47/17 |
| 4,441,145 | 4/1984 | Antkowiak | 362/384 |
| 4,482,844 | 11/1984 | Schweer et al. | 315/194 |
| 4,539,625 | 9/1985 | Bornstein et al. | 362/32 |
| 4,583,321 | 4/1986 | Stanhope | 470/17 |
| 4,845,554 | 7/1989 | Kimura et al. | 358/98 |
| 4,896,455 | 1/1990 | Kuban | 470/66 |
| 4,951,084 | 8/1990 | von Stein et al. | 355/38 |
| 4,996,791 | 3/1991 | Sprung | 470/17 |
| 5,238,974 | 2/1994 | Graf, Jr. | 47/60 |
| 5,343,121 | 8/1994 | Terman et al. | 315/158 |
| 5,345,149 | 9/1994 | Ham | 315/244 |
| 5,424,618 | 6/1995 | Bertenshaw et al. | 315/324 |
| 5,459,373 | 10/1995 | Ham | 315/150 |
| 5,589,741 | 12/1996 | Terman et al. | 315/360 |

OTHER PUBLICATIONS

Grover, P.B. et al. Journal of Interdisciplinary Cycle Research 16 (1): 33–42, 1985.

Grover, P.B. Jr. et al. An inexpensive microprocessor-based lighting control for simulating natural photoenvironments in the laboratory. J. Interdiscip. Cycle Res., vol. 16, No. 1, pp. 33–42 (abstract only cited), 1985.

*Primary Examiner*—Mary E. Mosher
*Attorney, Agent, or Firm*—Arnold White & Durkee

[57] ABSTRACT

A system for simulating the lighting cycle of the sun comprising: means for obtaining a set of inflection points on a solar lighting cycle and obtaining the annual minimum sunlight value for a location at a predetermined latitude; means for reconstructing the daily and yearly solar cycle based about said set of inflection point and said minimum yearly value; means for determining the lighting period based upon said daily and yearly cycles; and means for activating a lighting device for the determined lighting period.

26 Claims, 13 Drawing Sheets

METHOD AND SYSTEM FOR SIMULATING THE SOLAR CYCLE

FIELD OF THE INVENTION

The invention relates to devices and methods which simulate the natural cycle of the sun. Specifically, the invention relates to devices and methods which reproduce the daily and yearly solar cycle and other environmental conditions.

SUMMARY OF THE INVENTION

It is a principle object of the invention to provide an algorithm that approximates the yearly solar cycle.

It is another object of the invention to provide an algorithm for calculating the amount of daily solar radiation over a year of a particular location which is adjustable for latitude of the location.

It is still another object of the invention to provide a system that senses the moisture level of the soil and is able to provide the proper moisture adjustments for the soil.

It is a further object of the invention to provide a system where the user can monitor data concerning the soil such as its pH, alkaline value, temperature and nutrient condition.

It is another object of the invention to provide an algorithm that calculates the solar cycle beginning on the winter solstice.

It is still another object of the invention to provide an algorithm which provides five seasonal sections creating the four seasonal changes.

It is yet another object of the invention to provide an algorithm that calculates the solar cycle with the algorithm aligning on the winter solstice yet allowing the user to initialize the algorithm to start at any point in time along the yearly cycle.

Still another object of the invention is to provide an algorithm which provides five seasonal sections creating the four seasonal changes which allows the algorithm to align on the point of allegorical origin, the winter solstice.

It is a further object of the invention to provide a system that incorporates methods of stimulating plant growth.

It is yet another object of the invention to provide a system that reconstructs the duration and intensity of the daily solar cycle in real time.

It is still another object of the invention to provide a system that is compact in size and easy to use.

These and other objects are accomplished in a system for simulating the lighting cycle of the sun comprising means for obtaining a set of inflection points on a solar lighting cycle and obtaining the annual minimum sunlight value for a location at a predetermined latitude; means for reconstructing the daily and yearly solar cycle based about said set of inflection point and said minimum yearly value; means for determining the lighting period based upon said daily and yearly cycles; and means for activating a lighting device for the determined lighting period.

DETAILED DESCRIPTION OF THE PREFERRED EMBODIMENT

Figure 1A:
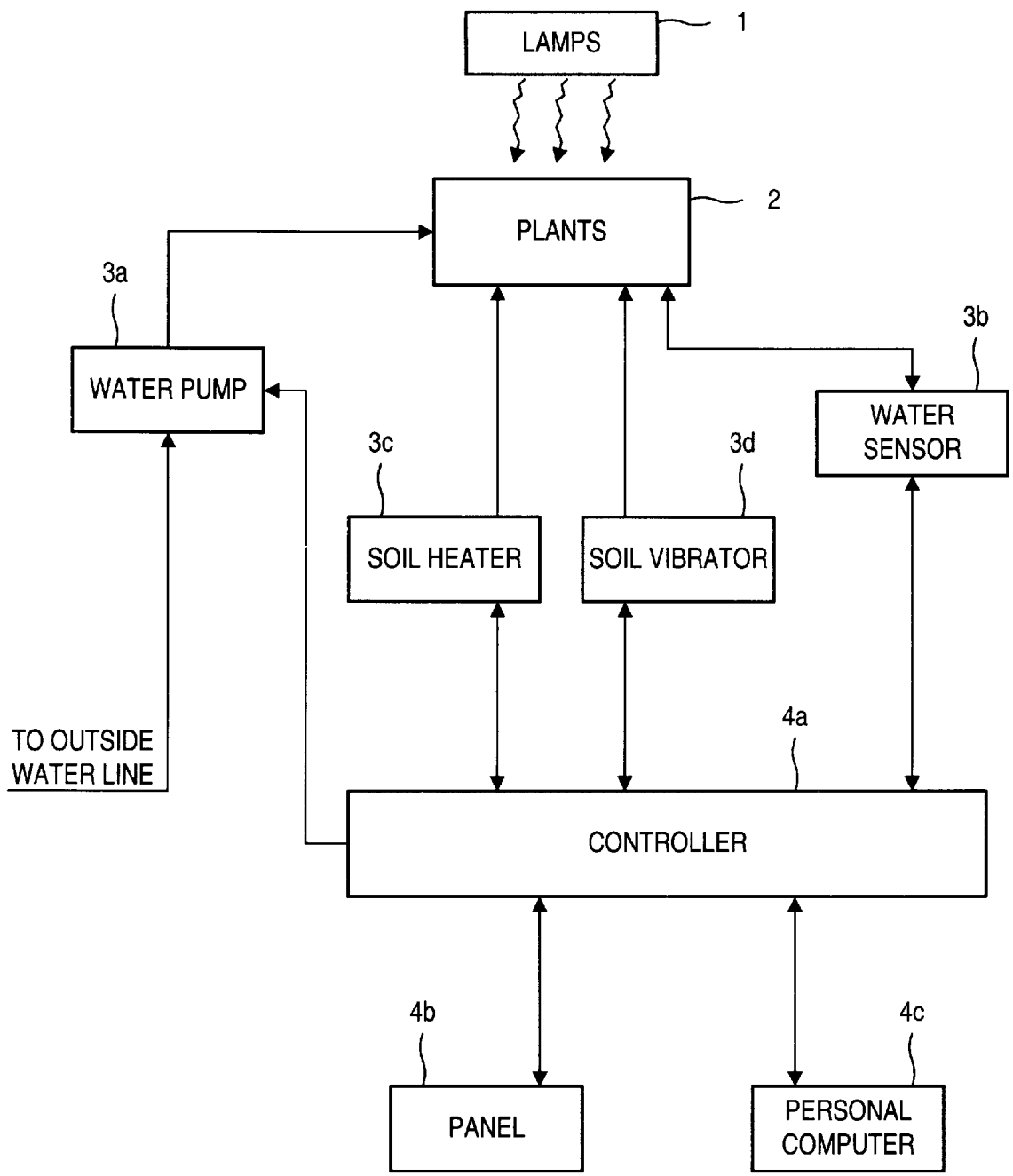
FIG. 1a is a block diagram of the system according to principles of the present invention.

Referring now to FIG. 1a, lamps 1 emit light onto plants 2. The amount, intensity, and duration of the light is determined by the algorithm described in detail, below. To provide proper moisture levels for the plants 2, a water pump 3a pumps water to the plants 2 from an outside water line. A water sensor 3b determines the moisture level of the soil containing the plants 2 and heating elements 3c warm the soil where the plants 2 are placed. To stimulate the thermal conditions of the soil, a soil vibrator 3d moves the soil. A controller 4a activates a water pump 3a, soil heater 3c, soil vibrator 3d, and receives soil-moisture data from a water sensor 3b. A control panel 4b coupled to the controller 4a allows a user to enter commands directing the operation of the system. A host computer 4c is also connected to the controller 4a allowing the user to enter commands; such commands may include instructions to perform a measurement or display results of previous measurements. The host computer 4c also displays and analyzes data from the system such as temperature and soil moisture levels. Although the description above relates to systems involving plants, it will be understood that the principles of the invention can be applied to any environment requiring an accurate reproduction of the daily and yearly solar cycle.

Figure 1B:
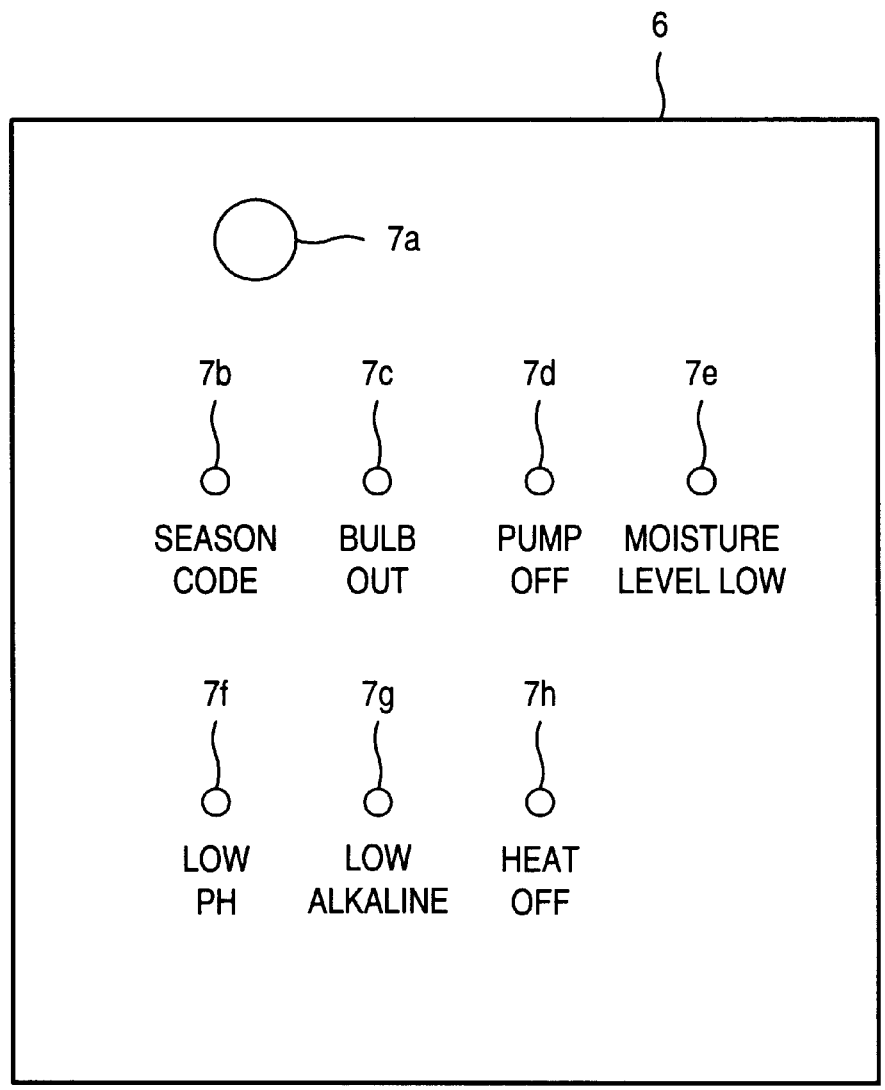
FIG. 1b is a diagram of the control panel with LEDs according to principles of the present invention.

Referring now to FIG. 1b, the control panel contains a button 7a allowing the user to activate and control the system. A "season code" LED 7b is lit by controller 4a and indicates the current season "section" or the current season by flashing a predetermined number of times. For example, LED 7b may flash once for spring and twice for summer to indicate the system is in that particular season. A "bulb out" LED 7c flashes if the lamp gives no light. A "pump indicator" LED 7d is lit by controller 4a if the water pump is operating and turned off otherwise. A "low moisture level" LED 7e is activated until a requested water level is achieved by the system. The personal computer 4c can be equipped with software as is known in the art to display the above information. LEDs 7f, 7g, 7h indicate a low soil pH, a low alkaline level, and the state of the heater.

Figure 1C:
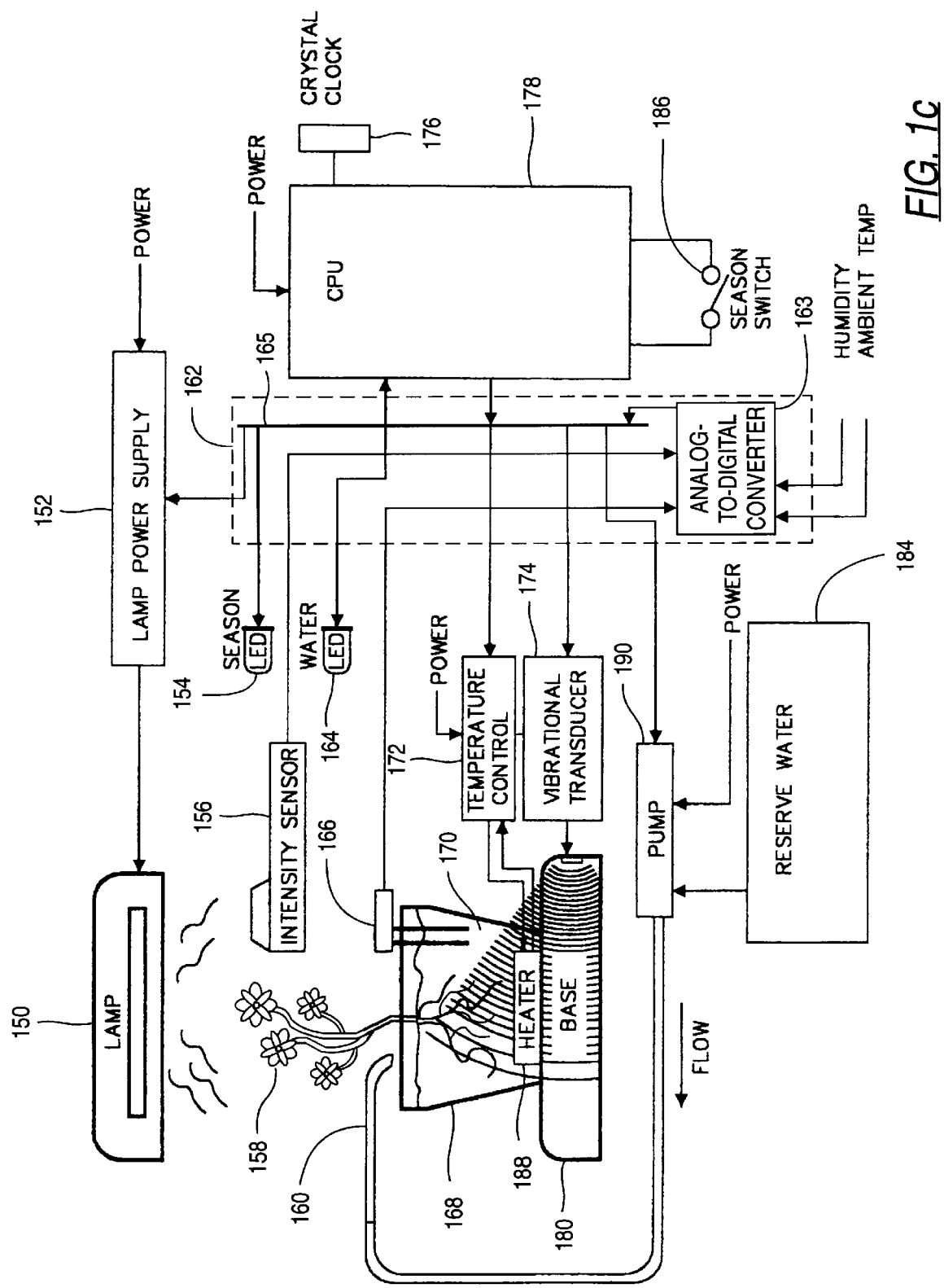
FIG. 1c is a block diagram of the system according to principles of the present invention.

Referring now to FIG. 1c, an alternate embodiment of the system is now described. A central processing unit (CPU) 178 is supplied with power and is clocked by a crystal clock 176. The central processing unit 178 is preferably a PIC12C5 series microcontroller manufactured by Microchip Technology, Inc. although any other comparable microcontroller can be used. A season switch 186 is coupled to the CPU 178 and indicates the proper season to the CPU 178.

The CPU 178 communicates through a control interface 162 which comprises an analog-to-digital converter 163 and bus 165. The analog-to-digital converter 163 changes analog signals representing humidity and ambient temperature to digital signals and then transmits the digital signals over the bus 165 to the CPU 178. The analog-to-digital converter 163 is a LM331 analog-to-digital converter or any similar device.

The CPU 178 also sends signals over the bus 165 to season LED 154 which indicates the season to the user and water LED 164 which indicates low moisture level of the plant. Additionally, the CPU 178 transmits signals which activate a temperature control 172 (which controls the heater 188), a vibrational transducer 174, a water pump 190, and a lamp power supply 152.

The lamp power supply 152 receives power and provides for the proper turn on times of lamps 150. The lamp interface turns on the lamp 150 which supplies light to plants 158 which are bedded in soil alkaline 170. The plants 158 are housed in a planter 168 with a base 180. The interface 162 receives information concerning the intensity of the light of the lamps 150 by the intensity sensor 154 and moisture information from the moisture sensor 166. The interface 162 also controls temperature control 172. The temperature control 172 activates a heater 188 which warms the soil and a vibrational transducer 174 which agitates the soil as needed. Reservoir 184 provides water to the water pump 190 which provides water to the plants via pipe 160.

Figure 1D:
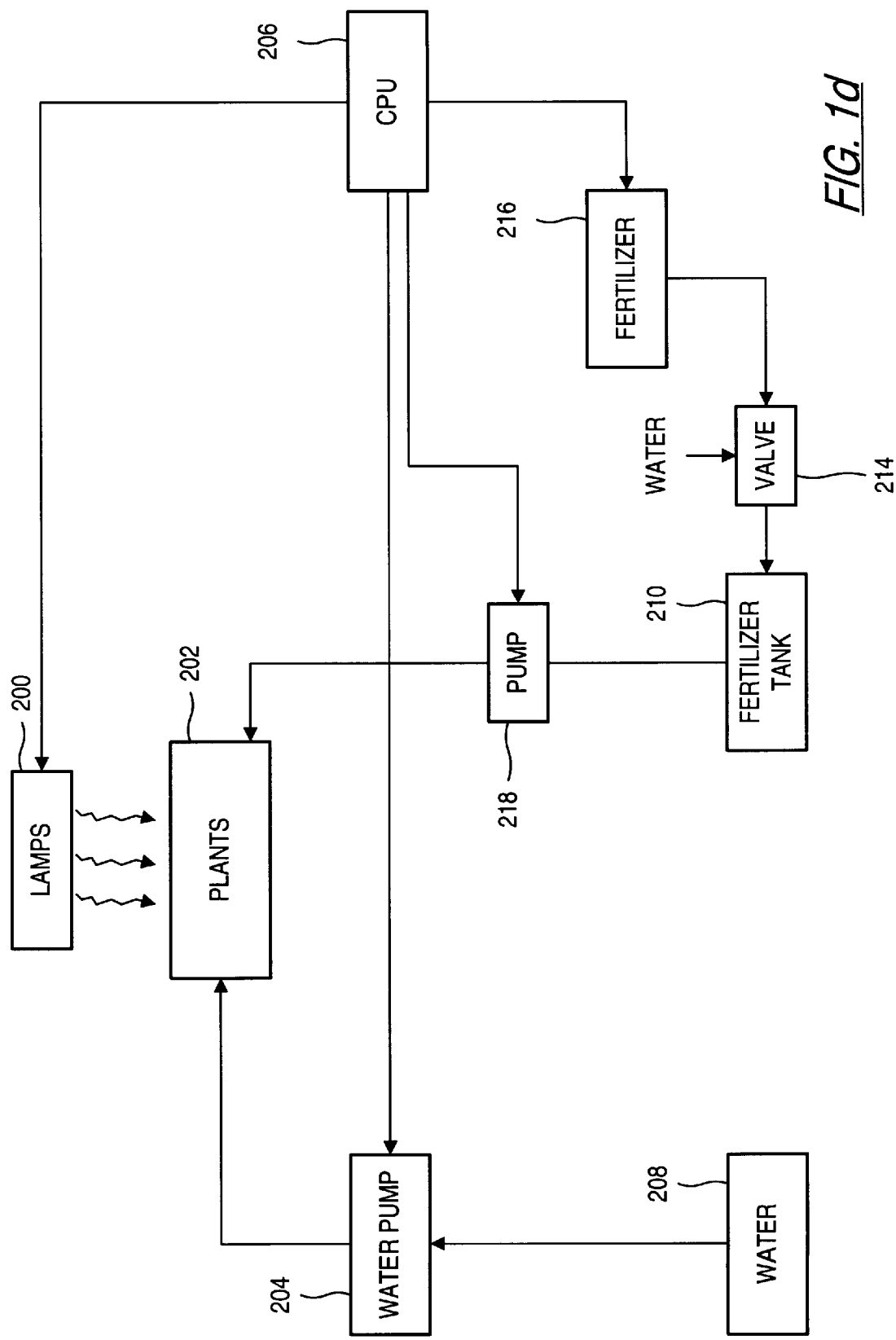
FIG. 1d is a block diagram of the system with a fertilizer dispenser according to principles of the present invention.

Yet another embodiment of the system is illustrated in FIG. 1*d*. For the purpose of mixing fertilizer 216 and water from an outside water line, a CPU 26 sends signals which open and close a valve 214. The fertilizer water mixture at the output of valve 210 is subsequently stored in fertilizer tank 210. A pump 218 applies the fertilizer-water mixture from the fertilizer tank 210 to the plants 202. The CPU 206 also controls lamps 200 which supply light to the plants 202. Additionally, the CPU activates a water pump 204 which applies water from a water tank 208 to the plants 202.

Figure 1E:
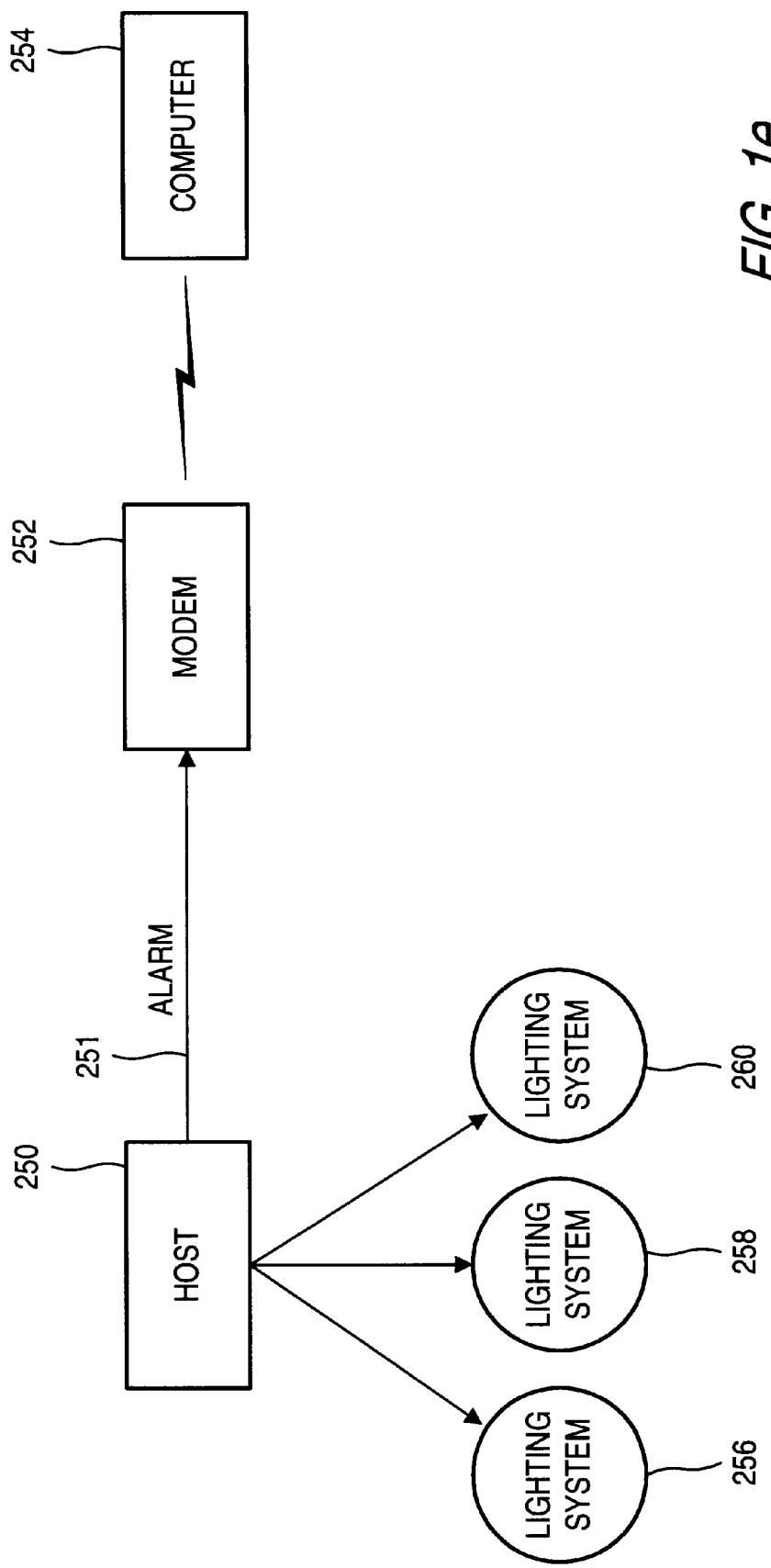
FIG. 1e is a block diagram of a network of systems according to principles of the present invention.

Referring now to FIG. 1*e*, a network of systems which simulate the daily and yearly solar cycles comprises a first lighting system 256, a second lighting system 258 and a third lighting system 260. These systems are of the types described in connected with FIGS. 1*a*, 1*c*, and 1*d* and described above. The systems 256, 258, and 260 communicate with a host CPU 250 which sends alarms over a communication channel 251 to a modem 252. The alarms are messages which indicate low water level or faulty equipment, for example. The modem is coupled over telephone lines 251 to a remote computer 254 which has software which monitors the systems 256, 258, and 260 as well as the host CPU 250.

Figure 1F:
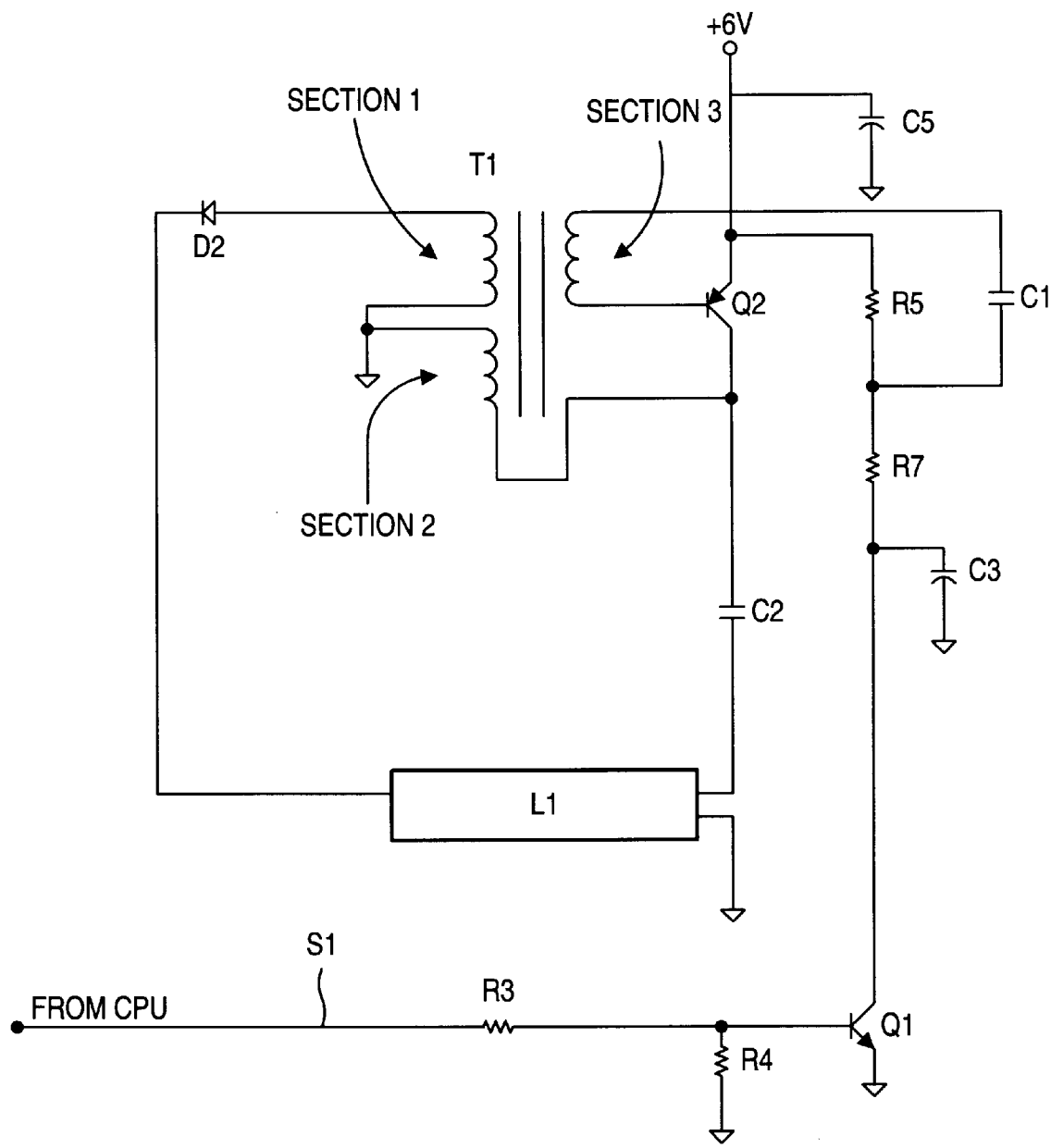
FIG. 1f is a circuit diagram of the lamp power supply according to principles of the present invention.

Referring now to FIG. 1*f*, the lamp power supply of the present invention is illustrated. A transistor Q1 is activated on by a signal over signal line S1 from the CPU. Resistors R3 and R4 bias the transistor Q1 and transistor Q1 biases a transistor Q2. When activated by Q1, Q2 begins to conduct section 2 of the transformer T1. The conduction of this section of the transformer T1 induces a voltage in transistor section 3 further driving the transistor Q2 toward saturation. When saturation of Q2 occurs, the voltage inducement halts. The magnetic field created collapses, which induces a voltage in section 1 of the transformer. The voltage in this section of the transformer is passed through D2 and is applied to the lamp L1. As the collector of Q2 is biased, this induces a voltage through C2 into the filament of the lamp L1 causing the heating of that filament. When the filament is sufficiently heated, the lamp produces light. The power from section 1 of the transformer lights the lamp L1. Capacitors C3 and C5 act as filters for switching spikes produced by the transistor Q1. R5, R7 and C1 control the operating point of Q2.

Figure 1G:
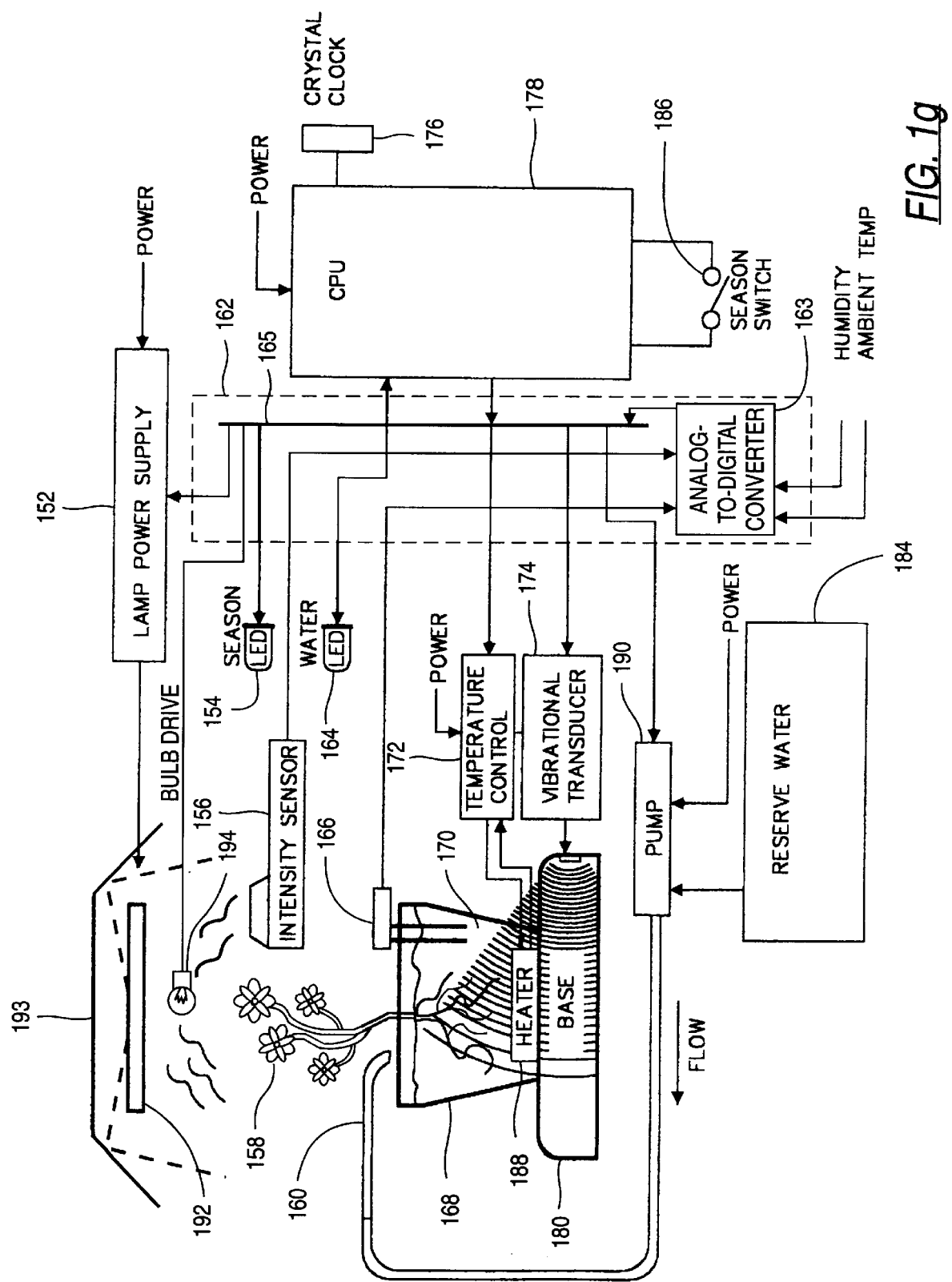
FIG. 1g is a block diagram of another embodiment of the system according to principles of the present invention.

Referring now to FIG. 1*g*, a florescent lamp 192 sends light to reflector 193 to the outer areas of a plants 158. The florescent lamp 192 transmits light in the high frequency range of the visible spectrum. In order to transmit light in the low frequency range of the visible spectrum, an incandescent bulb 194 is used. The bulb is activated by a bulb drive signal which is driven by the CPU. The reflector 193 is adjustable so that the light incident on it can shine on the outer areas of the plant. To this effect, the reflector has sides which are hinged to the top of the reflector body. The other elements of the system are the same as those as described above in reference to FIG. 1*c*, and function in a similar manner.

Figure 2A:
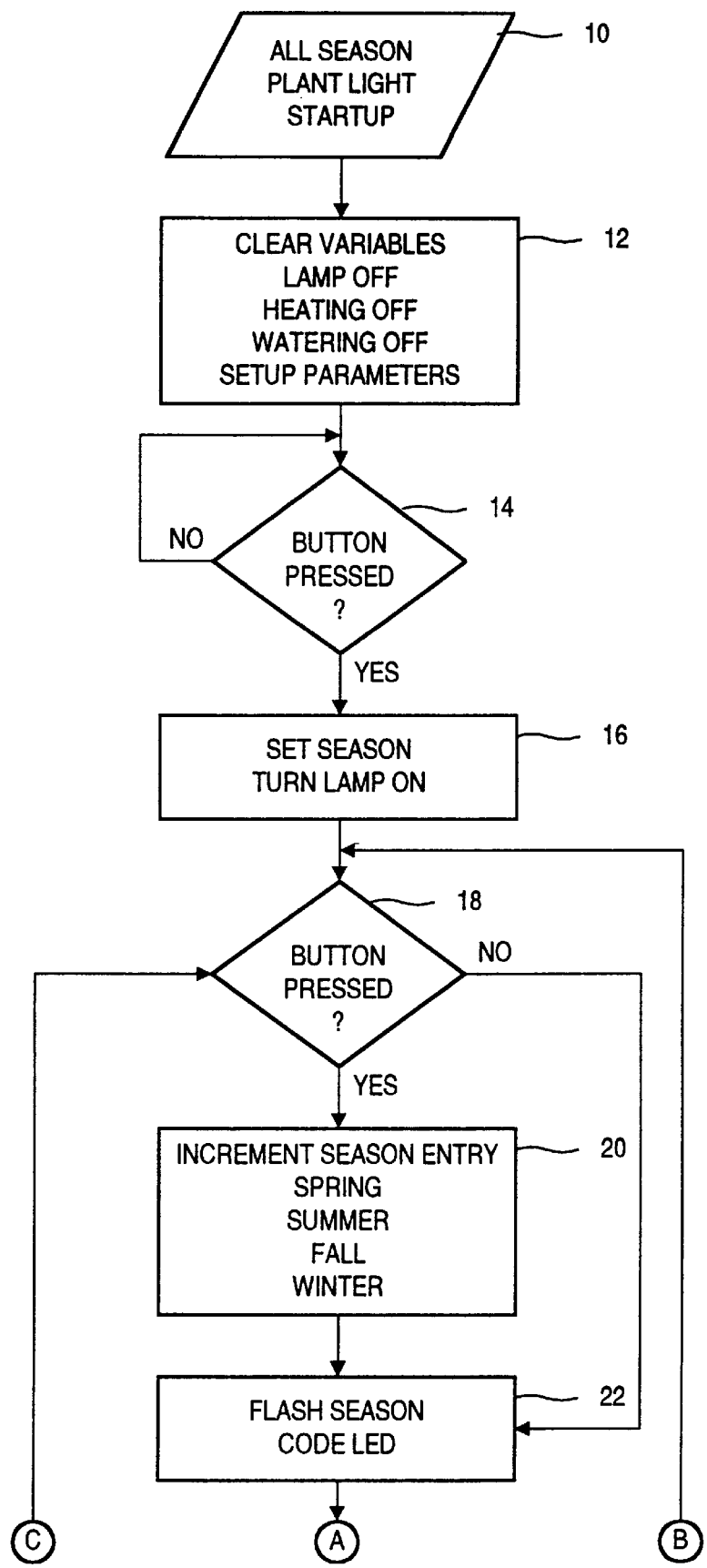
FIGS. 2a–2b are flowcharts of the operation of the system according to principles of the present invention.
Figure 2B:
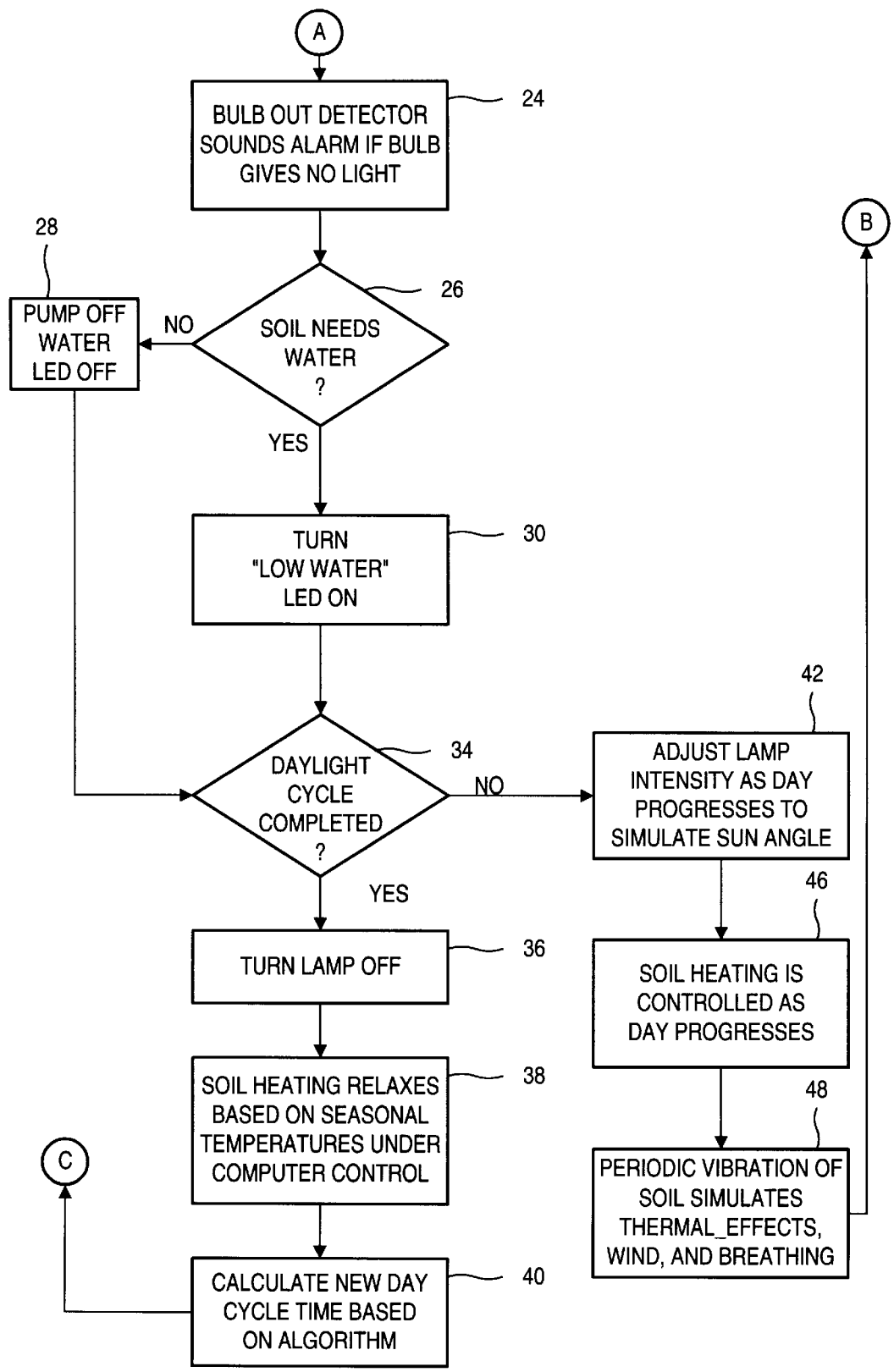

Referring now to FIGS. 2*a* and 2*b*, at step 10 startup of the system begins. Next, at step 12, the variables used in calculations are cleared, the lamps are turned off, and the water pump is turned off. Variables cleared include those associated with the "lighting time" algorithm which is described below. At step 14, the system determines whether the control button has been pressed. If the answer is negative, then the system returns to step 14 and determines whether the button 7*a* has been pressed.

If the answer to step 14 is affirmative, then the system sets the variable "season" to the correct season and activates the plant lamp. The "correct" season is determined by where in what part of the growth cycle the plant is in. For example, the plant may be in full bloom, indicating that it is in the "summer" part of the growth cycle. Alternatively, the variable season could be set to the current season. At step 18, the system determines if the control button has been pressed. If the answer to step 18 is negative, the system continues with step 22 as described below. If the answer to step 18 is affirmative, then at step 20 the system increments the season entry to the next season. For example, if the season is currently "spring", it will be incremented to "summer" or if the season is currently "winter" then the season will be incremented to "spring."

At step 22, the season code LED is flashed by the system indicating the season in the cycle where the light is being simulated. Next, at step 24 the "bulb out" detector sounds an alarm if the lamp gives no light. The alarm may be an audio alarm or display a message on the screen of host computer 4*c*. At step 26, the system determines if the soil needs water. This is accomplished by receiving data from the sensor 3*b*. If the answer to step 26 is affirmative, the system continues with step 28, as described below. If the answer to step 26 is negative, then at step 30, the water pump is turned on and, at step 32, a LED indicates a low water level. The system then continues with step 34.

At step 28, the system turns off the "pump off" LED indicating that the water pump is off and that no water is needed by the plant. The system then continues with step 34. At step 34, the system determines whether the daylight cycle has been completed. If the answer is negative, the system continues with step 42 as described below. If the answer to step 34 is affirmative, then the system continues with step 36 where the lamp is turned off. Next, at step 38, the soil heating is relaxed based on seasonal temperatures under computer control. Then, at step 40 a new day cycle time is calculated based on the algorithm described below. The system returns to step 18 where control proceeds as described above.

At step 42, the system adjusts the intensity of the lamps as the day progresses which simulates the angle of the sun. For example, the lamp intensity is adjusted to be greatest in the middle of the day and least at the beginning and end of the day. The soil heating is controlled at step 46 as the day progresses in a manner similar to that regarding lamp intensity. Next, at step 48, the soil is vibrated periodically to simulate the soil's thermal condition and simulate root growth. The system then returns to step 18 where control proceeds as described above.

The cyclical physical stimulations used at step 48 are in the form of low frequency vibrations induced into the soil on command by a specific function contained with the above-described algorithm. This stimulation has the effect of recreating the thermal expansion and contraction of the soil as well as wind movement that would otherwise be present in an outdoor environment. Both wind movement and thermal expansion affect the strength of the plants. A plant sitting in an indoor environment lacks the vital thermal stimulation or subtle movement of surrounding soil. A computer can be programmed for various stimuli based on the natural climate of a given plant. In addition to physical stimuli, a thermal stimulus is applied to the soil (controlled heating of soil) at step 46.

Figure 3:
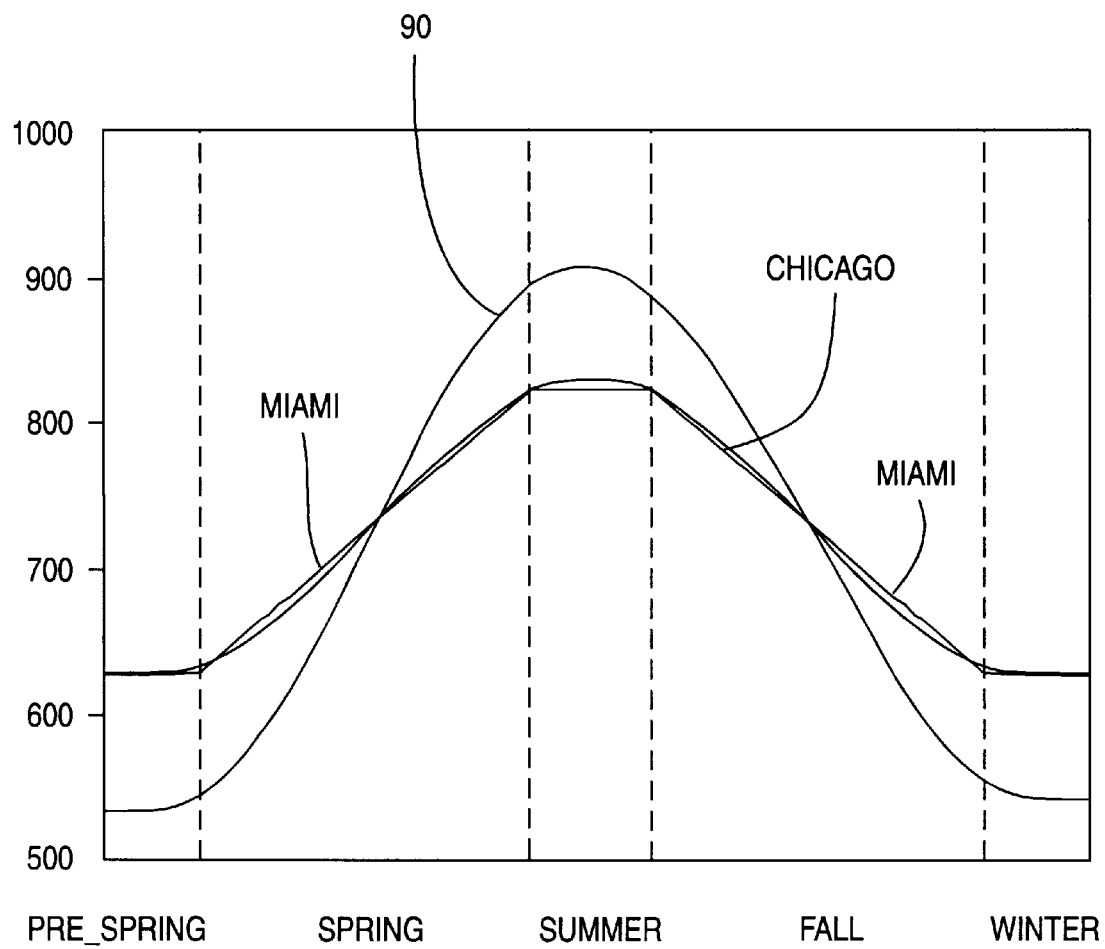
FIG. 3 is a graph of the intensity of solar radiation over a given year according to principles of the present invention.

The algorithm used to calculate the duration of daily light is now described in greater detail in FIGS. 3 and. 4a–4c. As shown in FIG. 3, the number of minutes of daylight can be approximated by a sinusoidal curve 90. As will be described below, the algorithm estimates the sinusoidal curve by a piece-wise, linear approximation. The shape of this approximation curve is affected by the latitude of the location of the system. For example, as shown in FIG. 3, curves for Chicago and Miami will vary due to the different latitudes of these two cities. It will also be noted in reference to FIG. 3 that the year is divided amongst five sections which are used to simulate the traditional four seasons; these five seasons include pre-spring, spring, summer, winter, and fall.

Figure 4A:
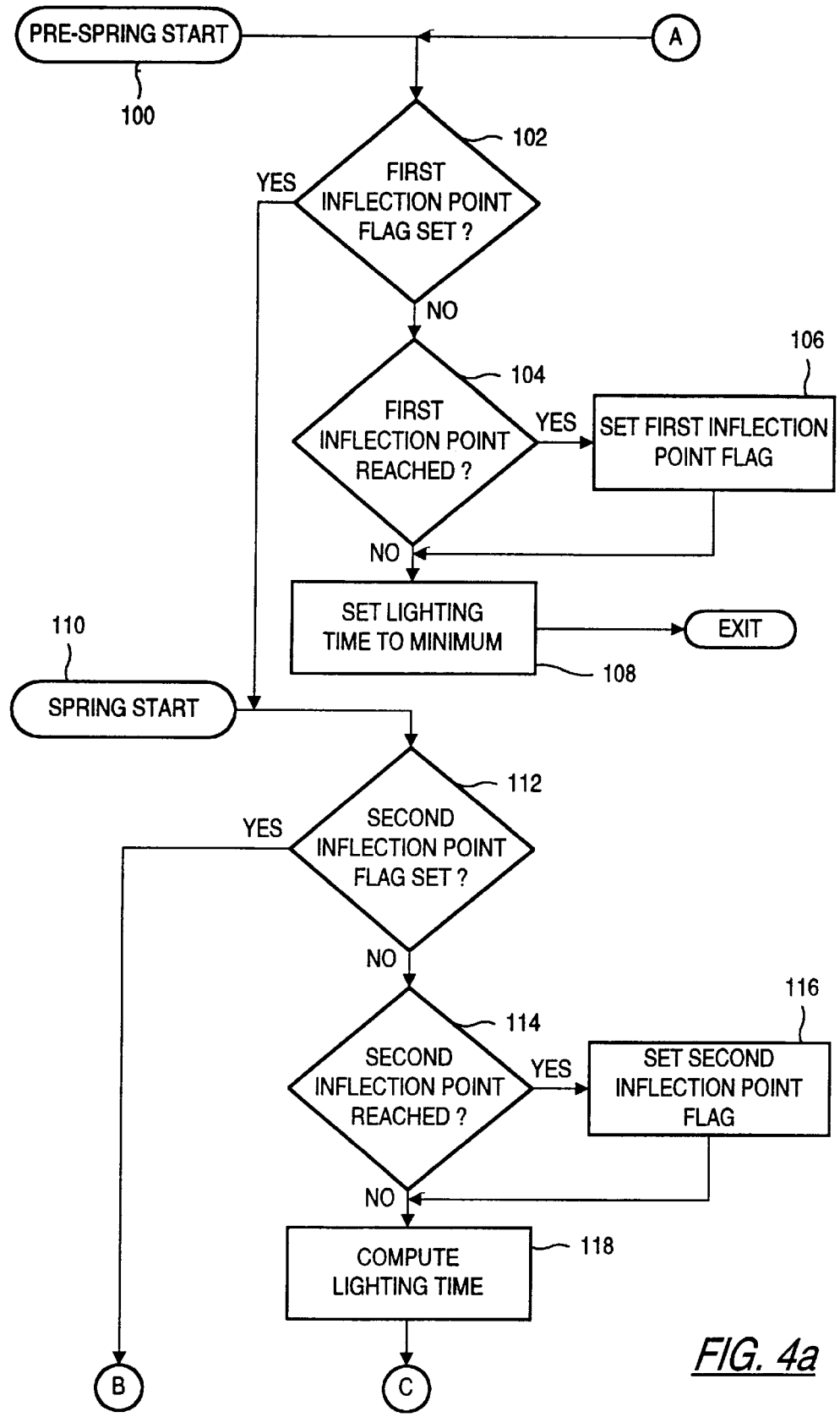
FIGS. 4a–4c are flowcharts of the lighting time determination algorithm according to principles of the present invention.
Figure 4B:
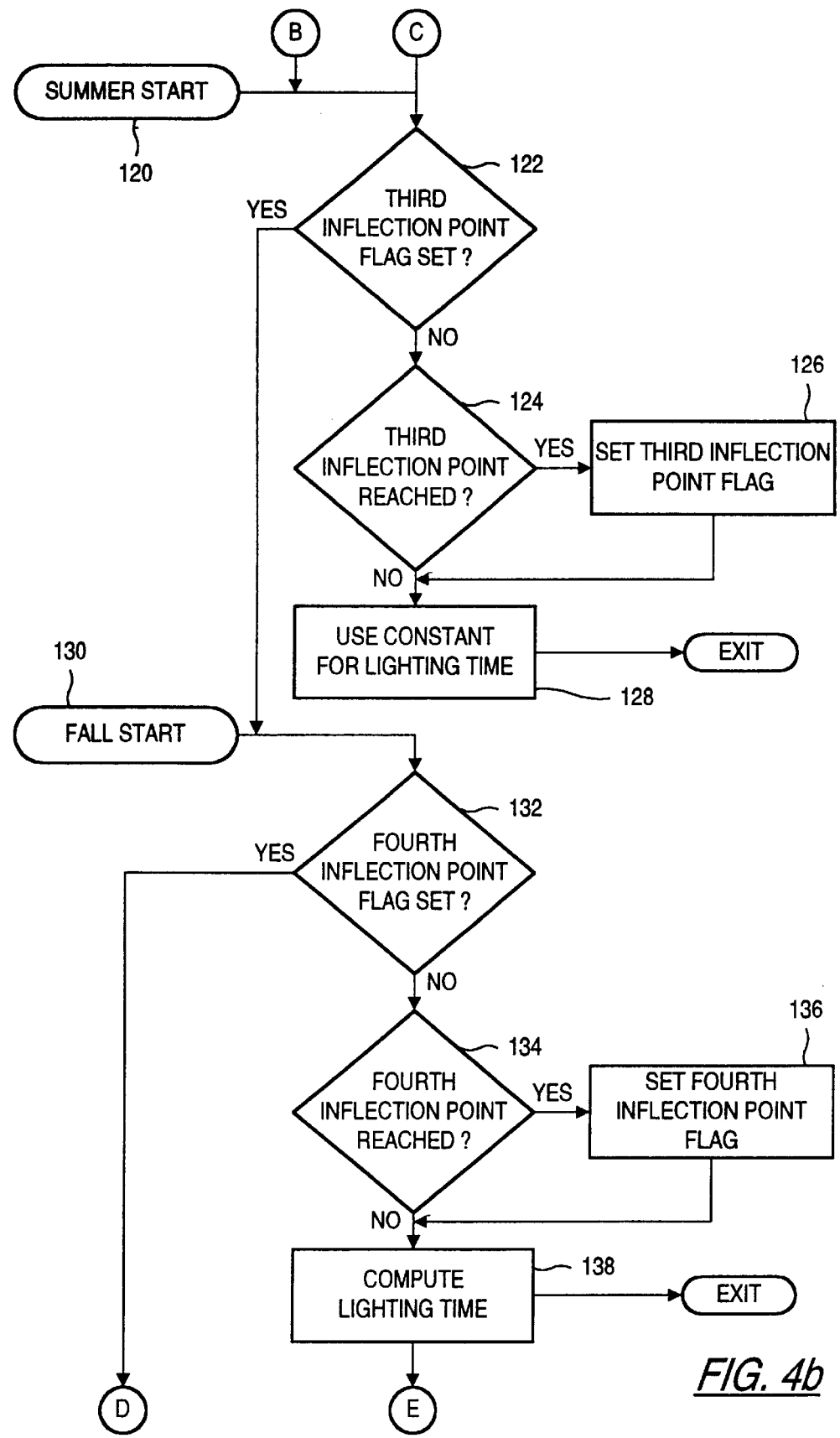
Figure 4C:
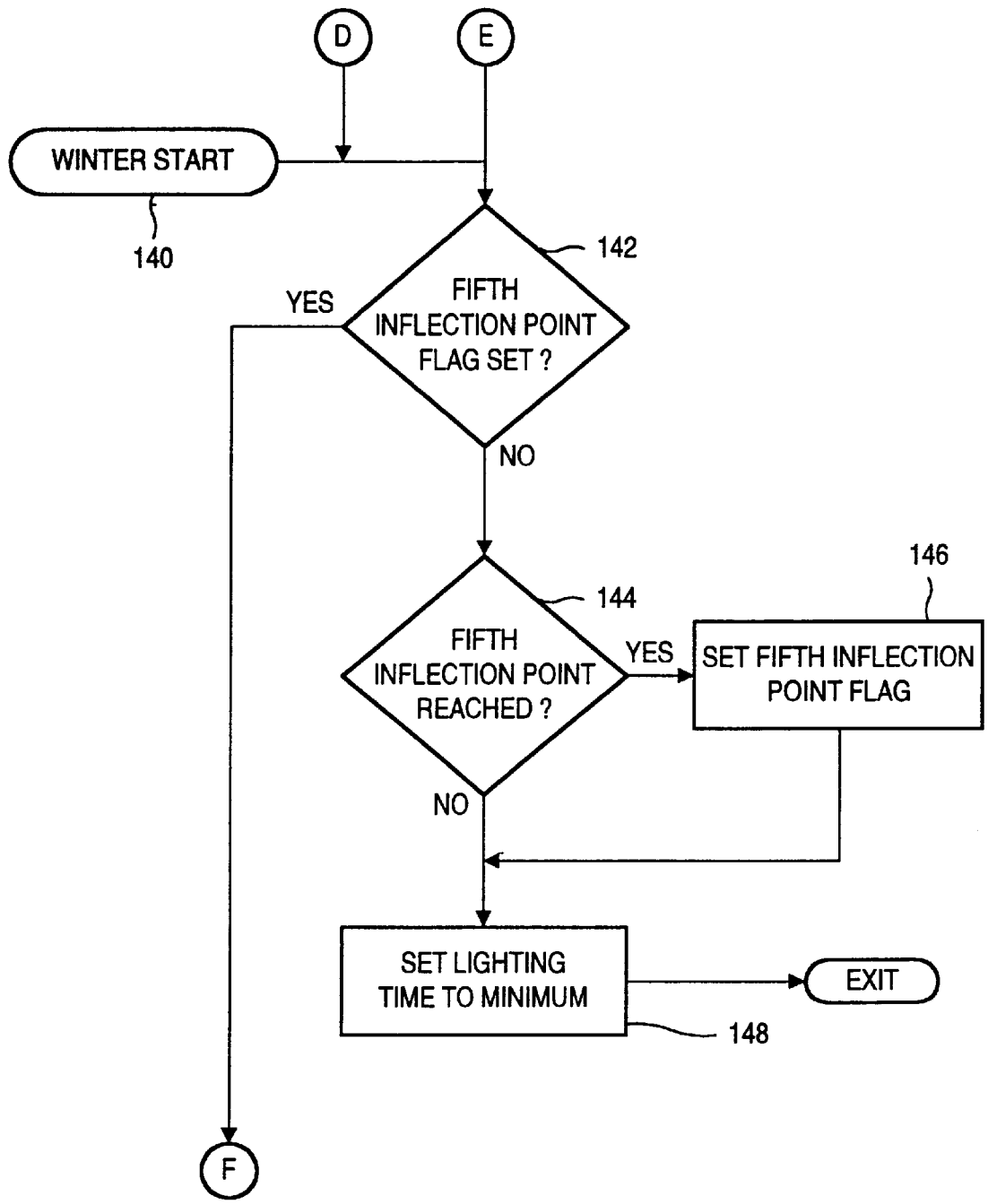

The algorithm of FIGS. 4a–4c reconstructs the sinusoidal cycle at the points of maximum and minimum inflection of the curve which occur where the second derivative of the sinusoidal curve is the highest and where the first derivative at a point becomes zero. Where the second derivative of the curve is the lowest, the first derivative reaches its highest place (i.e., the lighting curve has its greatest rate of change). From the reconstruction, the algorithm determines the duration of light from the lamps for a particular date.

As described below, the invention allows the cyclic reconstruction to begin on the winter solstice, December 21, and proceeds with five seasonal sections instead of the traditional four seasons. Of course, the reconstruction could begin upon any date. This feature allows alignment on the winter solstice. Subsequent seasonal settings, if desired, can be accomplished by advancing the seasonal start point. Thus, the algorithm reconstructs both daily and yearly sunlight variances automatically and without intervention throughout 365 days.

As described below, a set of seven integer numbers along with a special number that sets a minimum value are determined in order to reconstruct the sun's daily and yearly cycles. These values include the points that mark the five seasons and the upward and downward slopes during spring and fall. The set of values determined at this step allows the system to linearly generate the first and second derivatives for the sinusoidal lighting curve, which are used then used to determine a lighting time for a particular day. This method has the advantage of minimizing the error of lighting between 2 to 4% over the course of a year.

Referring again to FIGS. 4a–4c, the algorithm which determines the duration of daily light includes entry points into the algorithm based on the season of entry. For example, the algorithm can be entered at step 100 if pre-spring is the selected entry point. Otherwise, the algorithm can be entered at step 110 if spring is the selected starting point, or at step 120 if summer is the selected entry point, or at step 130 if fall is the selected entry point. Finally, the algorithm can be entered at step 140 if winter is the selected entry point. Although the algorithm is described below using a pre-spring entry point, it will be understood that the algorithm operates identically no matter which entry point is selected. The user is responsible for selecting the entry point into the algorithm.

At step 102, the system determines whether the first inflection point flag has been set. If this flag has been set, then the current date is beyond the first inflection point in the solar cycle and the algorithm should proceed to analyze whether the current date is beyond the second inflection point. In other words, if the answer to step 102 is affirmative, then control proceeds to step 112 and proceeds as described below.

If the answer to step 102 is negative, then control proceeds to step 104 where the system determines whether the first inflection point has been reached. If the answer to this step is affirmative, then the point has just been reached and control proceeds to step 106 where the first inflection point flag is set and control proceeds to step 108. Upon subsequent entry into the algorithm, steps 104 through 108 will be bypassed.

If the answer at step 104 is negative, then the first inflection point has not been reached and control proceeds to step 108 where the lighting time is set to the seasonal minimum value. After step 108 is executed, the algorithm is exited.

If the first inflection point flag has been set, indicating the current date (for which a lighting time is required) is not in the pre-spring period, then the algorithm proceeds to step 112. At step 112, the system determines whether the second inflection point flag has been set indicating the current date is not in the spring period. In other words, if the answer to step 112 is affirmative, then control proceeds to step 122 and proceeds as described below.

If the answer to step 112 is negative, then control proceeds to step 114 where the system determines whether the second inflection point has been reached. If the answer to this step is affirmative, then the point has just been reached and control proceeds to step 116 where the second inflection point flag is set. Then, control proceeds to step 118. In this case, upon the next entry into the algorithm, steps 114 through 118 will be bypassed.

If the answer at step 114 is negative, then the second inflection point has not been reached and control proceeds to step 118 where the lighting time is computed using a linear approximation. After step 118 has been executed, the algorithm is exited. The linear approximation is made by adding a constant whose value depends upon the latitude of the location where the system is based. For example, if the system were simulating the solar cycle in Miami, a value of 83 seconds would be adding to a running total.

If the second inflection point flag has been set, indicating the current date (for which a lighting time is required) is not in the spring period, then the algorithm proceeds to step 122. At step 122, the system determines whether the third inflection point flag has been set which indicates that the current date is not in the summer period. In other words, if the answer to step 122 is affirmative, then control proceeds to step 132 and proceeds as described below.

If the answer to step 122 is negative, then control proceeds to step 124 where the system determines whether the third inflection point has been reached. If the answer to this step is affirmative, then the point has just been reached and control proceeds to step 126 where the third inflection point flag is set and control proceeds to step 128. In this case, upon the next entry into the algorithm, steps 124 through 128 will be bypassed.

If the answer at step 124 is negative, then the third inflection point has not been reached and control proceeds to step 128 where the lighting time is set to the seasonal maximum value. After step 128 has been executed, the algorithm is exited.

If the third inflection point flag has been set, indicating the current date (for which a lighting time is required) is not in the summer period, then the algorithm proceeds to step 132. At step 132, the system determines whether the fourth inflection point flag has been set which indicates that the current date is not in the fall period. In other words, if the answer to step 132 is affirmative, then control proceeds to step 142 and proceeds as described below.

If the answer to step 132 is negative, then control proceeds to step 134 where the system determines whether the fourth inflection point has been reached. If the answer to this step is affirmative, then the point has just been reached and control proceeds to step 136 where the fourth inflection point flag is set and control proceeds to step 138. In this case, upon the next entry into the algorithm, steps 134 through 138 will be bypassed.

If the answer at step 134 is negative, then the fourth inflection point has not been reached and control proceeds to step 138 where the lighting time is computed using linear approximations. The linear approximation is made by subtracting a constant whose value depends upon the latitude of the location where the system is based. For example, if the system were simulating the solar cycle in Miami, a value of 83 seconds would be subtracted to a running total. After step 138, the algorithm is exited.

If the fourth inflection point flag has been set, indicating the current date (for which a lighting time is required) is not in the fall period, then the algorithm proceeds to step 142. At step 142, the system determines whether the fifth inflection point flag has been set which indicates that the current date is not in the fall period. In other words, if the answer to step 142 is affirmative, then control proceeds to step 112 and proceeds as described above.

If the answer to step 142 is negative, then control proceeds to step 144 where the system determines whether the fifth inflection point has been reached. If the answer to this step is affirmative, then the point has just been reached and control proceeds to step 146 where the fifth inflection point flag is set. Control then proceeds to step 148. In this case, upon the next entry into the algorithm, steps 144 through 148 will be bypassed.

If the answer at step 144 is negative, then the fifth inflection point has not been reached and control proceeds to step 148 where the lighting time is set to the seasonal minimum. After execution of step 148, the algorithm is exited.

As can be seen from the above description, the algorithm requires the ability to store the values of the inflection point flags upon exiting from the algorithm. Also, the algorithm is meant to be entered for computation of a lighting time on each day of the year.

Thus, an algorithm is provided that calculates the sinusoidal cycle representing the amount of daily solar radiation by using the points in the cycle of maximum and minimum inflection in the sinusoidal waveform in real time. Furthermore, the algorithm is adjustable for the proper latitude. The invention senses the dryness of the soil and is able to provide the proper moisture level for the soil and other data concerning the soil. The invention allows for the cycle to begin on the winter solstice and proceeds with five sections creating the traditional four seasons. The invention also provides a system that incorporates methods of stimulating plant growth. Finally, the system is compact in size and easy to use.

While the present invention has been described with reference to one or more preferred embodiments, those skilled in the art will recognize that many changes may be made thereto without departing from the spirit and scope of the present invention which is set forth in the following claims.

We claim:

1. A method for simulating the lighting cycle of the sun for plants in soil comprising the steps of:

providing a plant in soil;

calculating and identifying a set of four inflection points on a solar lighting cycle and obtaining the minimum daily number of minutes of sunlight per year for a location at a predetermined latitude;

reconstructing a piecewise-linear approximation of the daily and yearly solar cycle based upon said set of inflection points and said minimum number of minutes;

automatically determining the lighting period based upon said daily and yearly cycles; and activating a lighting device for the determined lighting period.

2. The method of claim 1 containing the further step of activating a soil heater for a predetermined length of time.

3. The method of claim 1 containing the further step of applying a physical stimulus to the soil.

4. The method of claim 1 wherein said steps of obtaining a set of inflection points, reconstructing the daily and yearly solar cycles, and determining the lighting periods are performed by a microprocessor.

5. The method of claim 1 wherein said reconstructing begins on the winter solstice.

6. The method of claim 1 further including the step of adding fertilizer to the soil.

7. The method of claim 1 further including the step of determining the pH of the soil.

8. The method of claim 1 further including the step of heating the soil to a predetermined temperature.

9. The method of claim 1 further including the steps of monitoring the moisture level of the soil and maintaining said moisture level at a predetermined level.

10. A method for simulating the lighting cycle of the sun for plants in soil comprising the steps of:

providing a plant in soil;

calculating and identifying a set of four inflection points on a solar lighting cycle and obtaining the minimum daily number of minutes of sunlight per year for a location at a predetermined latitude;

reconstructing a piecewise-linear approximation of the daily and yearly solar cycle based upon said set of inflection points and said minimum number of minutes, wherein said step of reconstructing the yearly solar cycle determines five piecewise linear sections representing the four seasons;

automatically determining the lighting period based upon said daily and yearly cycles; and activating a lighting device for the determined lighting period.

11. The method of claim 10 wherein said reconstructing begins on the winter solstice.

12. The method of claim 10 further including the step of adding fertilizer to the soil.

13. The method of claim 10 further including the step of determining the pH of the soil.

14. The method of claim 10 further including the step of heating the soil to a predetermined temperature.

15. The method of claim 10 further including the steps of monitoring the moisture level of the soil and maintaining said moisture level at a predetermined level.

16. A method for simulating the lighting cycle of the sun comprising the steps of:

calculating and identifying a set of four inflection points on a solar lighting cycle and obtaining the minimum daily number of minutes of sunlight per year for a location at a predetermined latitude;

reconstructing a piecewise-linear approximation of the daily and yearly solar cycle based upon said set of inflection points and said minimum number of minutes;

automatically determining the lighting period based upon said daily and yearly cycles; and activating a lighting device for the determined lighting period;

monitoring the moisture level of the soil and maintaining said moisture level at a predetermined level; and heating the soil to a predetermined temperature.

17. A method for simulating the lighting cycle of the sun for plants in soil comprising the steps of:

providing a plant in soil;

calculating and identifying a set of four inflection points on a solar lighting cycle and obtaining the minimum daily number of minutes of sunlight per year for a location at a predetermined latitude;

reconstructing a piecewise-linear approximation of the daily and yearly solar cycle based upon said set of inflection points and said minimum number of minutes;

automatically determining the lighting period based upon said daily and yearly cycles; and activating a lighting device for the determined lighting period;

monitoring the moisture level of the soil and maintaining said moisture level at a predetermined level;

heating the soil to a predetermined temperature;

determining the pH of the soil;

adding fertilizer to the soil; and applying a physical stimulus to the soil.

18. An electronic system for simulating the lighting cycle of the sun for plants in soil comprising:

means for calculating and identifying a set of four inflection points on a solar lighting cycle and obtaining the minimum daily number of minutes of sunlight per year for a location at a predetermined latitude;

means for reconstructing a piecewise-linear approximation of the daily and yearly solar cycle based about said set of inflection points and said minimum number of minutes;

means for automatically determining the lighting period based upon said daily and yearly cycles;

means for activating a lighting device for the determined lighting period; and means for applying a physical stimulus to the soil.

19. An electronic system for simulating the lighting cycle of the sun for plants in soil comprising:

means for calculating and identifying a set of four inflection points on a solar lighting cycle and obtaining the minimum daily number of minutes of sunlight per year for a location at a predetermined latitude;

means for reconstructing a piecewise-linear approximation of the daily and yearly solar cycle based about said set of inflection points and said minimum number of minutes;

means for automatically determining the lighting period based upon said daily and yearly cycles;

means for activating a lighting device for the determined lighting period; and means for dispensing fertilizer to said plants.

20. An electronic system for simulating the lighting cycle of the sun for plants in soil comprising:

means for calculating and identifying a set of four inflection points on a solar lighting cycle and obtaining the minimum daily number of minutes of sunlight per year for a location at a predetermined latitude;

means for reconstructing a piecewise-linear approximation of the daily and yearly solar cycle based about said set of inflection points and said minimum number of minutes;

means for automatically determining the lighting period based upon said daily and yearly cycles;

means for activating a lighting device for the determined lighting period; and means for determining the pH of the soil.

21. An electronic system for simulating the lighting cycle of the sun for plants in soil comprising:

means for calculating and identifying a set of four inflection points on a solar lighting cycle and obtaining the minimum daily number of minutes of sunlight per year for a location at a predetermined latitude;

means for reconstructing a piecewise-linear approximation of the daily and yearly solar cycle based about said set of inflection points and said minimum number of minutes;

means for automatically determining the lighting period based upon said daily and yearly cycles;

means for activating a lighting device for the determined lighting period; and means for determining the moisture level of the soil and means for maintaining the moisture level at a predetermined level.

22. A network comprising:

a multitude of remote units, said units interconnected and communicatively coupled to each other units, each remote unit for simulating the cycle of the sun for plants in soil, said remote units comprising means for calculating and identifying a set of inflection points on a solar lighting cycle and obtaining the minimum daily number of minutes of sunlight per year for a location at a predetermined latitude; means for reconstructing a piecewise-linear approximation of the daily and yearly solar cycle based about said set of inflection point and said minimum number of minutes; means for determining the lighting period based upon said daily and yearly cycles; a lighting device; a controller for sensing environmental conditions; a control panel coupled to said control panel for accepting commands from a user and displaying information to a user; and means for activating said lighting device for the determined lighting period; and central controller means coupled to said remote units for monitoring the performance of said remote units, wherein said remote units further comprise means for applying a physical stimulus to the soil.

23. A network comprising:

a multitude of remote units, said units interconnected and communicatively coupled to each other units, each remote unit for simulating the cycle of the sun for plants in soil, said remote units comprising means for calculating and identifying a set of inflection points on a solar lighting cycle and obtaining the minimum daily number of minutes of sunlight per year for a location at a predetermined latitude; means for reconstructing a piecewise-linear approximation of the daily and yearly solar cycle based about said set of inflection point and said minimum number of minutes; means for determining the lighting period based upon said daily and yearly cycles; a lighting device; a controller for sensing environmental conditions; a control panel coupled to said control panel for accepting commands from a user and displaying information to a user; and means for activating said lighting device for the determined lighting period; and central controller means coupled to said remote units for monitoring the performance of said remote units, wherein said remote units further comprise means for dispensing fertilizer to said plants.

24. A network comprising:

a multitude of remote units, said units interconnected and communicatively coupled to each other units, each remote unit for simulating the cycle of the sun for plants in soil, said remote units comprising means for calculating and identifying a set of inflection points on a solar lighting cycle and obtaining the minimum daily number of minutes of sunlight per year for a location at a predetermined latitude; means for reconstructing a piecewise-linear approximation of the daily and yearly solar cycle based about said set of inflection point and said minimum number of minutes; means for determining the lighting period based upon said daily and yearly cycles; a lighting device; a controller for sensing environmental conditions; a control panel coupled to said control panel for accepting commands from a user and displaying information to a user; and means for activating said lighting device for the determined lighting period; and central controller means coupled to said remote units for monitoring the performance of said remote units, wherein said remote units further comprise means for determining the pH of the soil.

25. An electronic system for simulating the lighting cycle of the sun comprising:

means for calculating and identifying a set of four inflection points on a solar lighting cycle and obtaining the minimum daily number of minutes of sunlight per year for a location at a predetermined latitude;

means for reconstructing a piecewise-linear approximation of the daily and yearly solar cycle based about said set of inflection points and said minimum number of minutes;

means for automatically determining the lighting period based upon said daily and yearly cycles;

a lighting device;

a controller for sensing environmental conditions;

a control panel coupled to said controller for accepting commands from a user and displaying information to a user; and means for activating said lighting device for the determined lighting period.

26. An electronic system for simulating the lighting cycle of the sun for plants in soil comprising:

means for calculating and identifying a set of four inflection points on a solar lighting cycle and calculating the minimum daily number of minutes of sunlight per year for a location at a predetermined latitude;

means for reconstructing the daily and yearly solar cycle based about said set of inflection points and said minimum number of minutes, said reconstruction determining five piecewise linear sections representing the four seasons;

means for automatically calculating the lighting period based upon said daily and yearly cycles;

means for determining the pH of the soil; and means for activating a lighting device for the determined lighting period.

* * * * *